US009118916B2

(12) United States Patent
Min et al.

(10) Patent No.: US 9,118,916 B2
(45) Date of Patent: *Aug. 25, 2015

(54) METHOD AND APPARATUS FOR ENCODING VIDEO BY USING DEBLOCKING FILTERING, AND METHOD AND APPARATUS FOR DECODING VIDEO BY USING DEBLOCKING FILTERING

(71) Applicant: SAMSUNG ELECTRONICS CO., LTD., Suwon-si, Gyeonggi-do (KR)

(72) Inventors: Jung-hye Min, Suwon-si (KR); Tammy Lee, Seoul (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,953

(22) Filed: Jan. 20, 2015

(65) Prior Publication Data
US 2015/0131718 A1  May 14, 2015

Related U.S. Application Data

(63) Continuation of application No. 14/307,096, filed on Jun. 17, 2014, which is a continuation of application No. 13/006,078, filed on Jan. 13, 2011, now Pat. No. 8,792,561.

(30) Foreign Application Priority Data

Jan. 14, 2010  (KR) .................. 10-2010-0003559

(51) Int. Cl.
*H04N 7/12*         (2006.01)
*H04N 11/02*        (2006.01)
(Continued)

(52) U.S. Cl.
CPC ........... *H04N 19/139* (2014.11); *H04N 19/117* (2014.11); *H04N 19/159* (2014.11); *H04N 19/182* (2014.11); *H04N 19/86* (2014.11)

(58) Field of Classification Search
USPC ........................................................ 375/240
See application file for complete search history.

(56) References Cited

U.S. PATENT DOCUMENTS 6,865,291 B1 *  3/2005  Zador ........................... 382/166
7,460,042 B2 * 12/2008  Oshikiri et al. ............... 341/107
(Continued)

FOREIGN PATENT DOCUMENTS

CN  101607836 A  12/2009
CN  101857001 A  10/2010
(Continued)

OTHER PUBLICATIONS

International Search Report (PCT/ISA/210) and Written Opinion (PCT/ISA/237) issued Sep. 15, 2011 in corresponding PCT Application No. PCT/KR2011/000244.
(Continued)

*Primary Examiner* — Joseph Ustaris
*Assistant Examiner* — Talha Nawaz
(74) *Attorney, Agent, or Firm* — Sughrue Mion, PLLC

(57) ABSTRACT

A method and apparatus for encoding video by using deblocking filtering, and a method and apparatus for decoding video by using deblocking filtering are provided. The method of encoding video includes: splitting a picture into a maximum coding unit; determining coding units of coded depths and encoding modes for the coding units of the maximum coding unit by prediction encoding the coding units of the maximum coding unit based on at least one prediction unit and transforming the coding units based on at least one transformation unit, wherein the maximum coding unit is hierarchically split into the coding units as a depth deepens, and the coded depths are depths where the maximum coding unit is encoded in the coding units; and performing deblocking filtering on video data being inversely transformed into a spatial domain in the coding units, in consideration of the encoding modes.

6 Claims, 18 Drawing Sheets

(51) Int. Cl.
    *H04N 11/04*    (2006.01)
    *H04N 19/139*   (2014.01)
    *H04N 19/86*    (2014.01)
    *H04N 19/117*   (2014.01)
    *H04N 19/159*   (2014.01)
    *H04N 19/182*   (2014.01)

(56) References Cited

U.S. PATENT DOCUMENTS

| | | | |
|---|---|---|---|
| 8,086,052 B2 | 12/2011 | Toth et al. | |
| 8,477,838 B2 | 7/2013 | Lu et al. | |
| 2005/0078750 A1* | 4/2005 | Shen et al. | 375/240.12 |
| 2005/0114093 A1 | 5/2005 | Cha et al. | |
| 2006/0251330 A1 | 11/2006 | Toth et al. | |
| 2006/0262990 A1* | 11/2006 | Lee et al. | 382/268 |
| 2008/0231633 A1* | 9/2008 | Keller et al. | 345/426 |
| 2009/0207911 A1* | 8/2009 | Minamoto | 375/240.03 |
| 2010/0322303 A1* | 12/2010 | Wada et al. | 375/240.01 |
| 2013/0113880 A1* | 5/2013 | Zhao et al. | 348/43 |

FOREIGN PATENT DOCUMENTS

| | | |
|---|---|---|
| KR | 1020000053028 A | 8/2000 |
| KR | 10-2005-0045746 A | 5/2005 |
| KR | 10-2006-0027795 A | 3/2006 |
| KR | 1020070026289 A | 3/2007 |
| KR | 10-0842558 B1 | 7/2008 |
| WO | 9820457 A1 | 5/1998 |
| WO | 2009051719 A2 | 4/2009 |

OTHER PUBLICATIONS

Communication dated Nov. 2, 2014, issued by the State Intellectual Property Office of P.R. China in counterpart Chinese Application No. 201180013472.5.

Communication dated Sep. 15, 2014, issued by the Korean Intellectual Property Office in counterpart Korean Application No. 10-2010-0003559.

Thomas Wiegand et al., "Draft ITU-T Recommendation and Final Draft International Standard of Joint Video Specification (ITU-T Rec. H.264 | ISO/IEC 14496-10 AVC)", Joint Video Team (JVT) of ISO/IEC MPEG & ITU-T VCEG (ISO/IEC JTC1/SC29/WG11 and ITU-T SG16 Q.6) 8th Meeting: Geneva, Switzerland, May 23-27, 2003, 269 pages total, JVT-G050r1.

Communication dated Mar. 24, 2015, issued by the Korean Intellectual Property Office in counterpart Korean Application No. 10-2014-0054389.

Communication dated Mar. 24, 2015, issued by the Korean Intellectual Property Office in counterpart Korean Application No. 10-2014-0148453.

Communication dated Apr. 8, 2015, issued by the Korean Intellectual Property Office in counterpart Korean Application No. 10-2014-0146430.

Communication dated Apr. 8, 2015, issued by the Korean Intellectual Property Office in counterpart Korean Application No. 10-2014-0148450.

Communication dated Apr. 8, 2015, issued by the Korean Intellectual Property Office in counterpart Korean Application No. 10-2014-0148451.

Communication dated Apr. 8, 2015, issued by the Korean Intellectual Property Office in counterpart Korean Application No. 10-2014-0148452.

* cited by examiner

FIG. 7
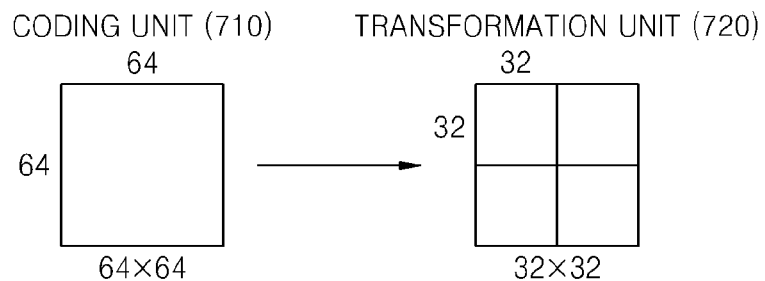
FIG. 8
'PARTITION TYPE'-INFORMATION (800)
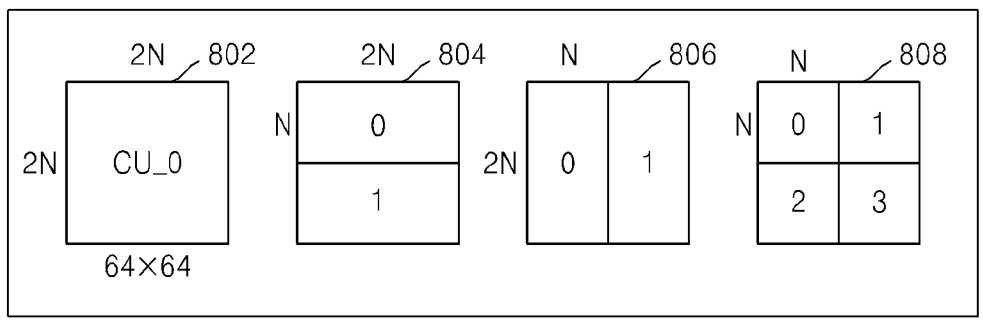
'PREDICTION MODE'-INFORMATION (810)
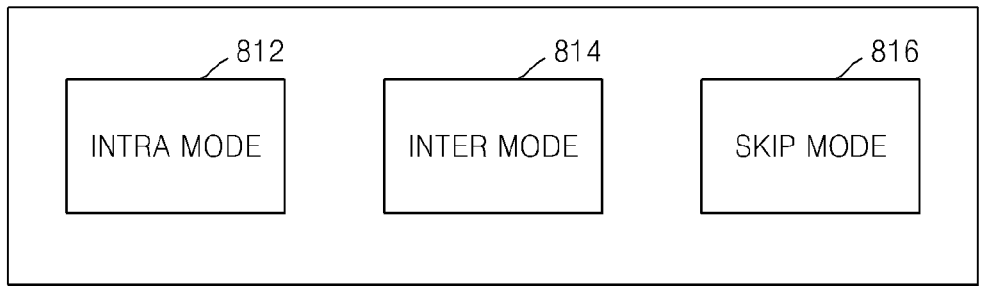
'SIZE OF TRANSFORMATION UNIT'-INFORMATION (820)
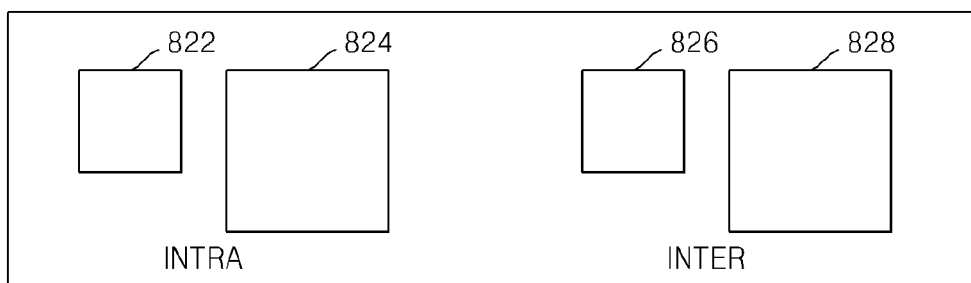

CODING UNITS (1010)

METHOD AND APPARATUS FOR ENCODING VIDEO BY USING DEBLOCKING FILTERING, AND METHOD AND APPARATUS FOR DECODING VIDEO BY USING DEBLOCKING FILTERING

CROSS-REFERENCE TO RELATED PATENT APPLICATIONS

This is a Continuation Application of U.S. application Ser. No. 14/307,096, filed Jun. 17, 2014, which is a Continuation Application of U.S. application Ser. No. 13/006,078, now U.S. Pat. No. 8,792,561, filed Jan. 13, 2011, which claims priority from Korean Patent Application No. 10-2010-0003559, filed on Jan. 14, 2010 in the Korean Intellectual Property Office, the disclosure of which is incorporated herein in its entirety by reference.

BACKGROUND

1. Field

The exemplary embodiments relate to encoding and decoding video.

2. Description of the Related Art

As hardware for reproducing and storing high resolution or high quality video content is being developed and supplied, there is an increasing need for a video codec for effectively encoding or decoding the high resolution or high quality video content. In a related art video codec, video is encoded according to a limited encoding method based on a macroblock having a predetermined size.

SUMMARY

One or more exemplary embodiments provide deblocking filtering performed in consideration of boundaries between various data units to be used in encoding and decoding processes, and video encoding and decoding using the deblocking filtering.

According to an aspect of an exemplary embodiment, there is provided a method of encoding video by using deblocking filtering, the method including: splitting a picture into a maximum coding unit; determining coding units of coded depths and encoding modes for the coding units of the maximum coding unit by prediction encoding the coding units of the maximum coding unit on the basis of at least one prediction unit and transforming the coding units on the basis of at least one transformation unit, wherein the maximum coding unit is hierarchically split into the coding units as a depth deepens, and the coded depths are depths where the maximum coding unit is encoded in the coding units; and performing deblocking filtering on video data being inversely transformed into a spatial domain in the coding units, in consideration of the determined encoding modes of the coding units.

The coding unit may be characterized by a maximum size and a depth.

The depth denotes the number of times a coding unit is hierarchically split, and as the depth deepens, deeper coding units according to depths may be split from the maximum coding unit to obtain minimum coding units. The depth is deepened from an upper depth to a lower depth. As the depth deepens, the number of times the maximum coding unit is split increases, and a total number of possible times the maximum coding unit is split corresponds to a maximum depth. The maximum size and the maximum depth of the coding unit may be pre-determined.

According to an aspect of another exemplary embodiment, there is provided a method of decoding video by using deblocking filtering, the method including: parsing a received bitstream to extract encoding modes of coding units and video data encoded in the coding units; producing transformation coefficients of the coding units by entropy decoding and inversely quantizing the encoded video data; reconstructing video data in a spatial domain by inversely transforming the transformation coefficients on the basis of a transformation unit and prediction decoding the transformation coefficients on the basis of a prediction unit, according to the encoding modes of the coding unit; and performing deblocking filtering on the video data in the spatial domain, in consideration of the encoding modes of the coding units.

The performing the deblocking filtering may include performing the deblocking filtering on boundaries of prediction units or transformation units corresponding to the coding units of the video data in the spatial domain, in consideration of the encoding modes of the coding units.

The performing the deblocking filtering may include performing the deblocking filtering in consideration of whether current boundaries are boundaries of at least one from among the coding units, prediction units, and transformation units, which are defined in the encoding modes of the coding units.

The performing the deblocking filtering may include performing the deblocking filtering in consideration of at least one from among the sizes of the coding units, sizes of the prediction units, and sizes of the prediction units according to the encoding modes of the coding units. The performing the deblocking filtering may include performing the deblocking filtering in consideration of partition types of the coding units according to the encoding modes of the coding units. The partition types may include a symmetrical partition type and an asymmetrical partition type.

The performing the deblocking filtering may include performing the deblocking filtering in consideration of a prediction mode of the prediction units, whether an encoded residual component exists, a motion vector, a number of reference pictures, and an index of the reference pictures, which are defined in the encoding modes of the coding units.

The performing the deblocking filtering may include determining a boundary strength in consideration of the encoding modes of the coding units, determining whether deblocking filtering is to be performed, or determining a deblocking filtering method including information regarding filter tab size.

According to an aspect of another exemplary embodiment, there is provided an apparatus for encoding video by using deblocking filtering, the apparatus including: a maximum coding unit splitter which splits a picture into a maximum coding unit; a coding unit and encoding mode determiner which determines coding units of coded depths and encoding modes for the coding units by prediction encoding the coding units of the maximum coding unit on the basis of at least one prediction unit and transforming the coding units on the basis of at least one transformation unit, wherein the maximum coding unit is hierarchically split into the coding units as a depth deepens and the coded depths are depths where the maximum coding unit is encoded in the coding units; and a deblocking filtering performing unit which performs deblocking filtering on video data being inversely transformed into a spatial domain in the coding units, in consideration of the determined encoding modes of the coding units.

According to an aspect of another exemplary embodiment, there is provided an apparatus for decoding video by using deblocking filtering, the apparatus including: a data extractor which parses a received bitstream to extract encoding modes of coding units and video data encoded in the coding units; an entropy decoding and inverse quantization unit which produces transformation coefficients of the coding units by entropy decoding and inversely quantizing the encoded video data; an inverse transformation and prediction decoding unit which reconstructs video data in a spatial domain by inversely transforming the transformation coefficients on the basis of a transformation unit and prediction decoding the transformation coefficients on the basis of a prediction unit, according to the encoding modes of the coding unit; and a deblocking filtering performing unit which performs deblocking filtering on the video data in the spatial domain, in consideration of the encoding modes of the coding units.

According to an aspect of another exemplary embodiment, there is provided a computer readable recording medium having recorded thereon a program for executing the method of encoding video by using deblocking filtering.

According to an aspect of another exemplary embodiment, there is provided a computer readable recording medium having recorded thereon a program for executing the method of decoding video by using deblocking filtering.

BRIEF DESCRIPTION OF THE DRAWINGS

The above and/or other aspects will become more apparent by describing in detail exemplary embodiments thereof with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

Hereinafter, a video encoding apparatus, a video decoding apparatus, a method of encoding video, and a method of decoding video according to exemplary embodiments will be described in detail with reference to FIGS. 1 to 24. Specifically, encoding and decoding video on the basis of spatially hierarchical data units according to exemplary embodiments will be described with reference to FIGS. 1 through 15. Also, encoding and decoding video by performing deblocking filtering in consideration of coding units, prediction units, and transformation units, according to exemplary embodiments, will be described with reference to FIGS. 16 through 24.

In this disclosure, a 'coding unit' means an encoding data unit in which image data is encoded at an encoder side, and an encoded data unit in which the encoded image data is decoded at a decoder side. Also, a 'coded depth' means a depth where a coding unit is encoded. Furthermore, an 'image' may denote a still image for a video or a moving image, that is, the video itself.

Figure 1:
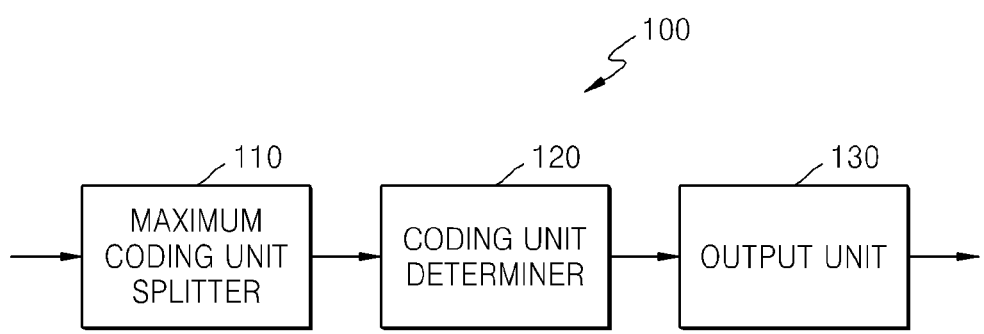
FIG. 1 is a block diagram of an apparatus for encoding a video, according to an exemplary embodiment.

FIG. 1 is a block diagram of a video encoding apparatus 100 according to an exemplary embodiment. The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into $4^1$ transformation units, and the size of the transformation unit is thus N×N, and may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
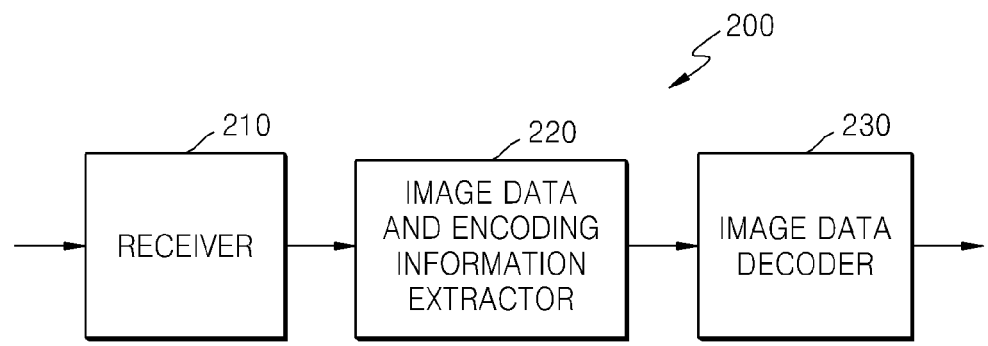
FIG. 2 is a block diagram of an apparatus for decoding a video, according to an exemplary embodiment.

FIG. 2 is a block diagram of a video decoding apparatus 200, according to an exemplary embodiment. The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
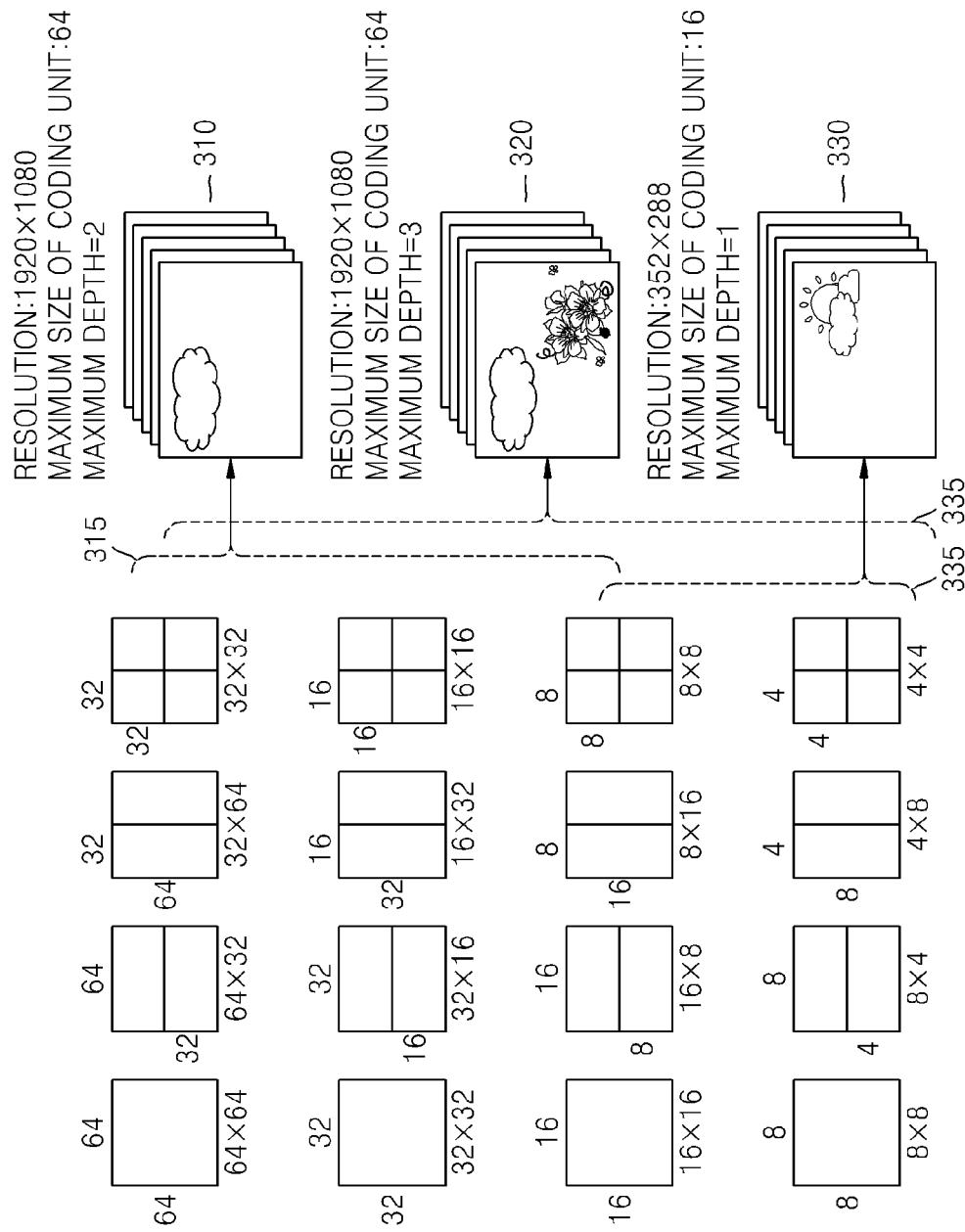
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
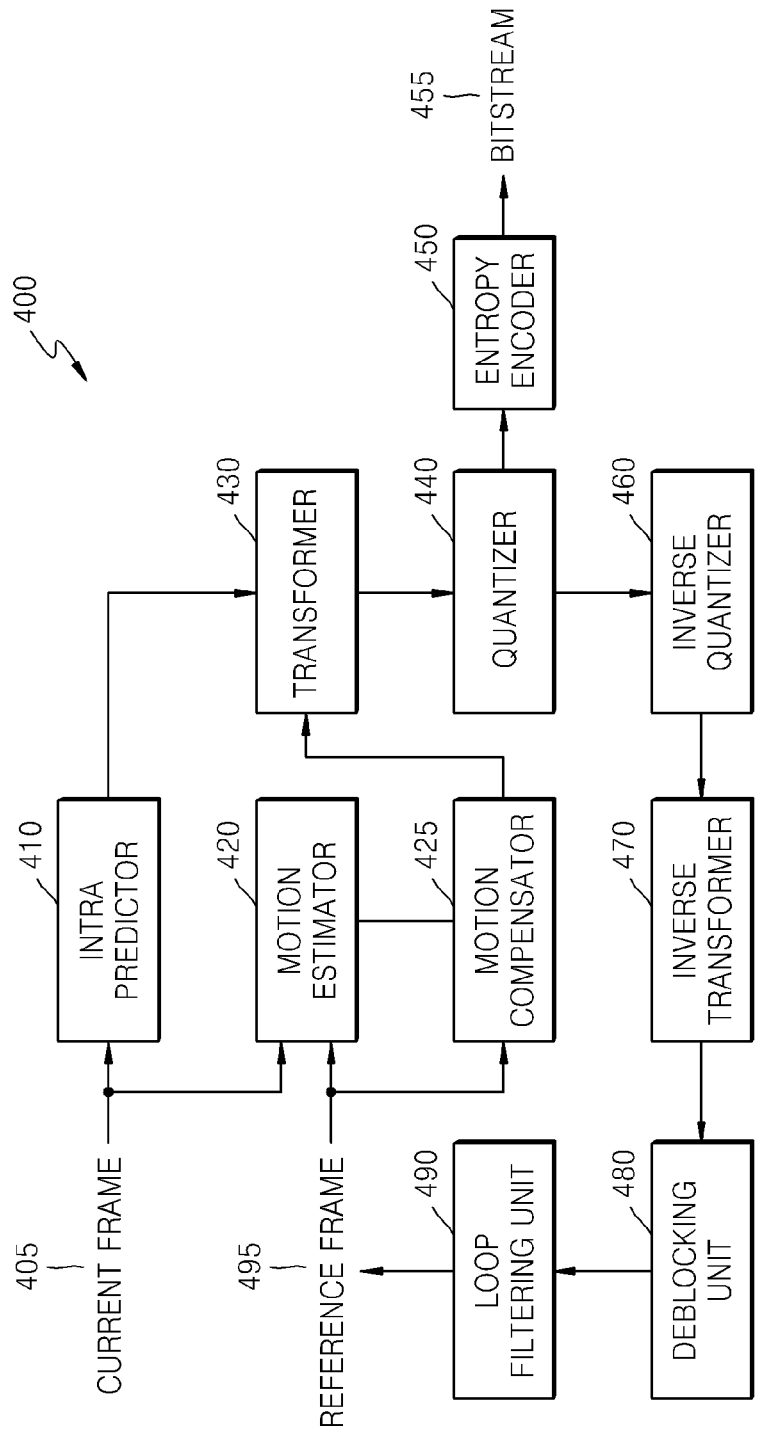
FIG. 4 is a block diagram of an image encoder based on coding units according to an exemplary embodiment.

FIG. 4 is a block diagram of an image encoder 400 based on coding units, according to an exemplary embodiment. The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
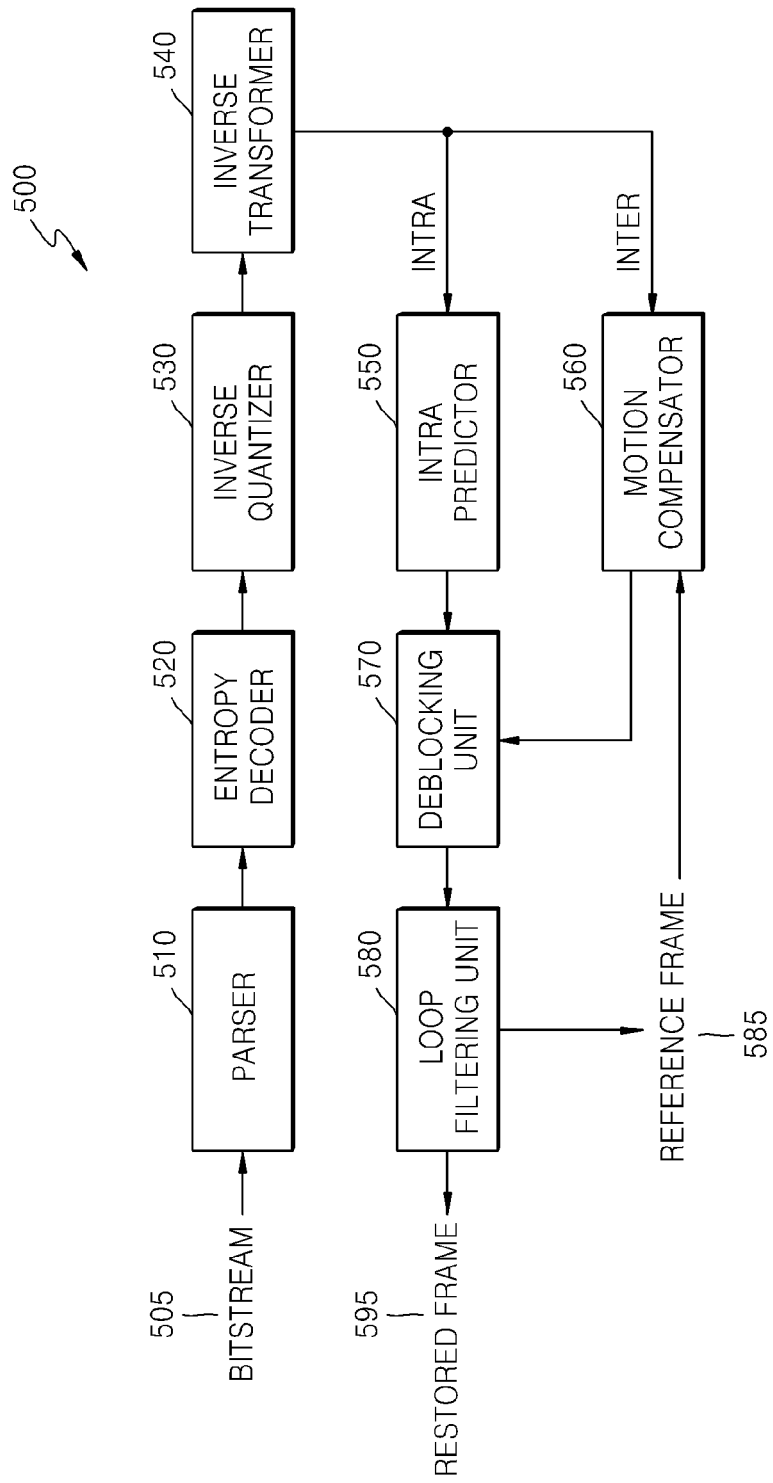
FIG. 5 is a block diagram of an image decoder based on coding units according to an exemplary embodiment.

FIG. 5 is a block diagram of an image decoder 500 based on coding units, according to an exemplary embodiment. A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Figure 6:
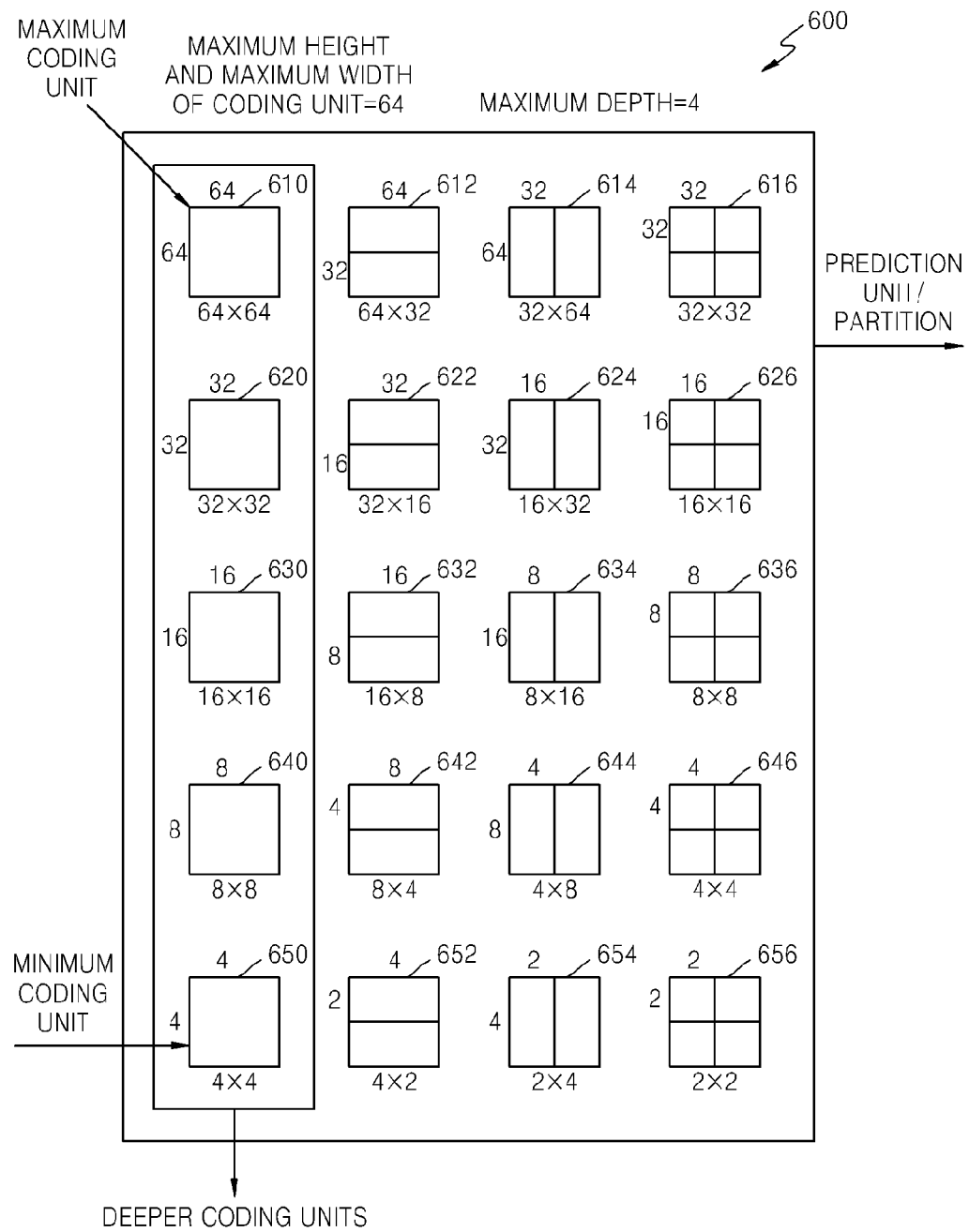
FIG. 6 is a diagram illustrating deeper coding units according to depths, and partitions according to an exemplary embodiment of the present invention.

FIG. 6 is a diagram illustrating deeper coding units according to depths, and partitions, according to an exemplary embodiment. The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment. The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment. The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
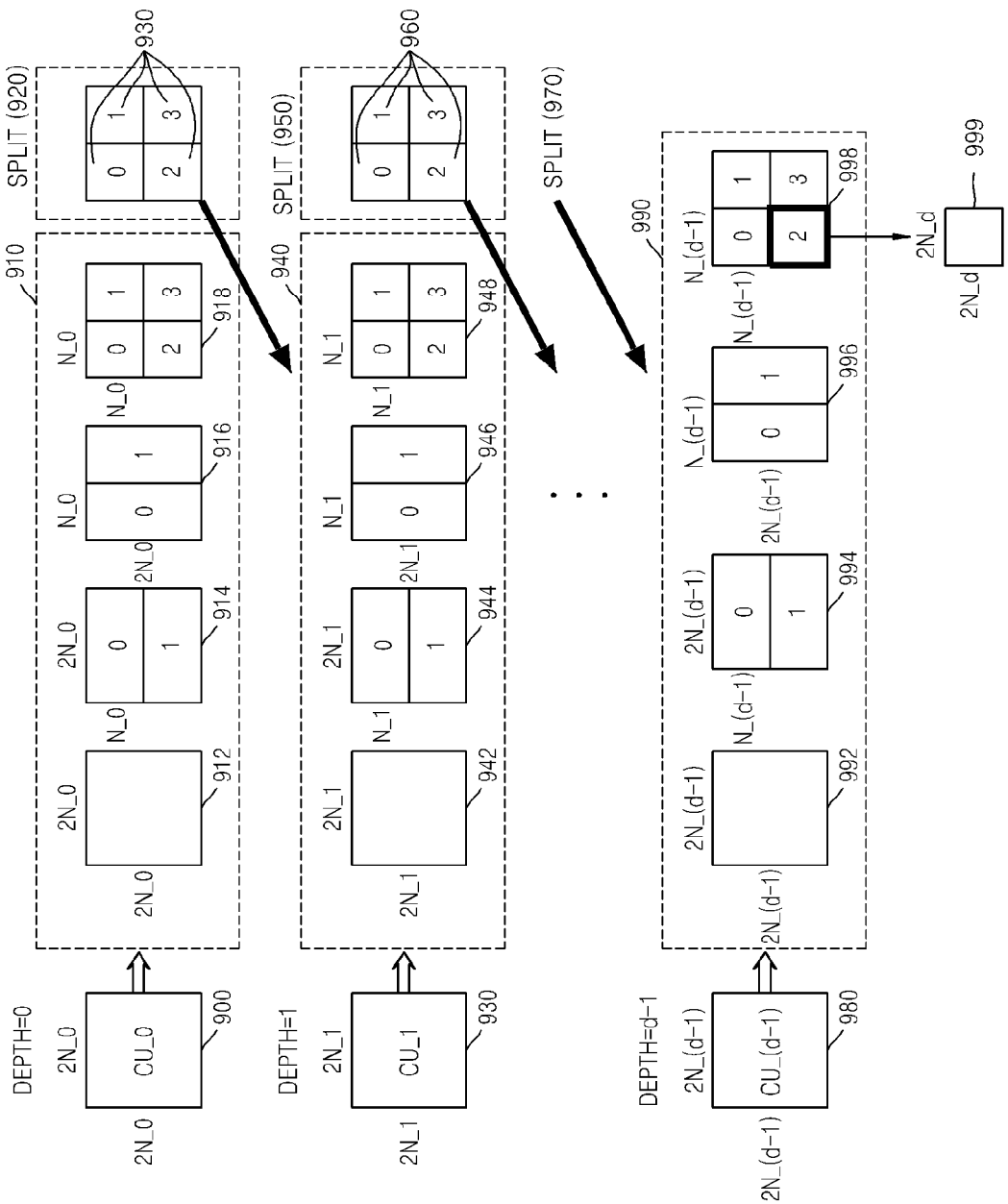
FIG. 9 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment. Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
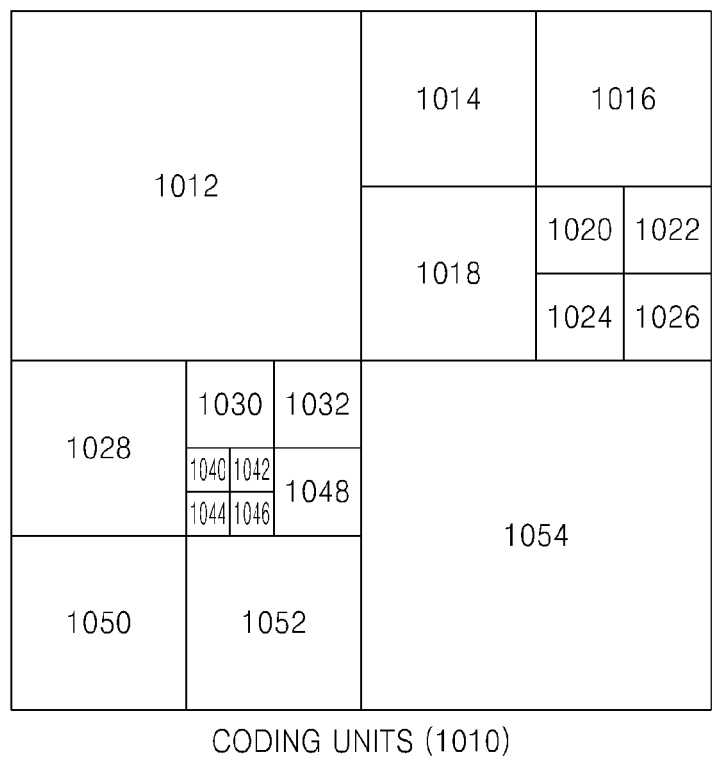
FIGS. 10 through 12 are diagrams for describing a relationship between coding units, prediction units, and transformation units, according to an exemplary embodiment.
Figure 11:
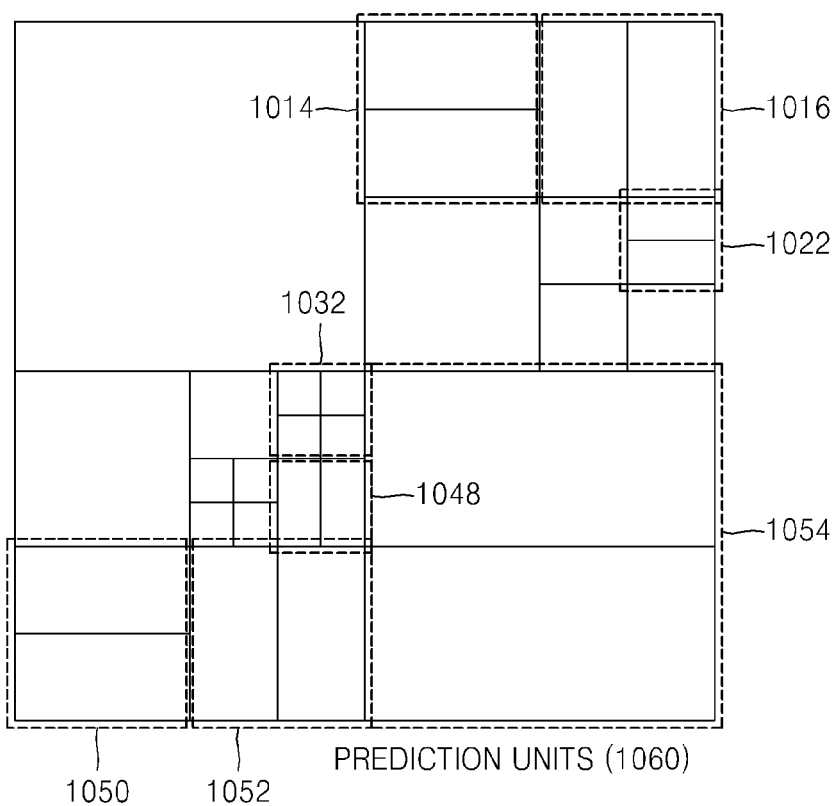
Figure 12:
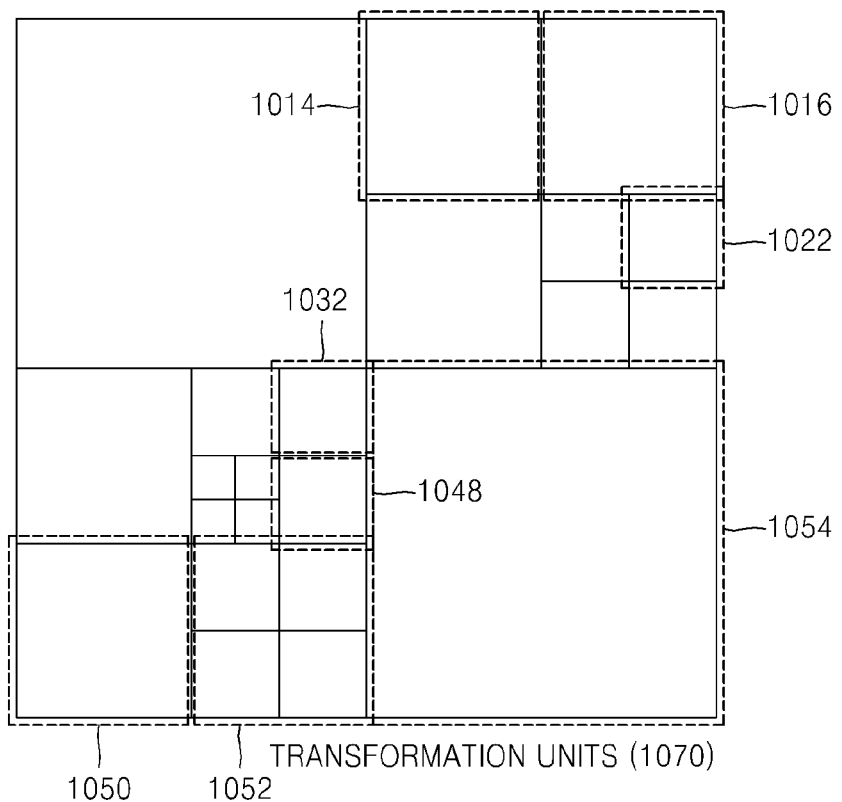

FIGS. 10 through 12 are diagrams for describing a relationship between coding units 1010, prediction units 1060, and transformation units 1070, according to an exemplary embodiment. The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N.

Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units Having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
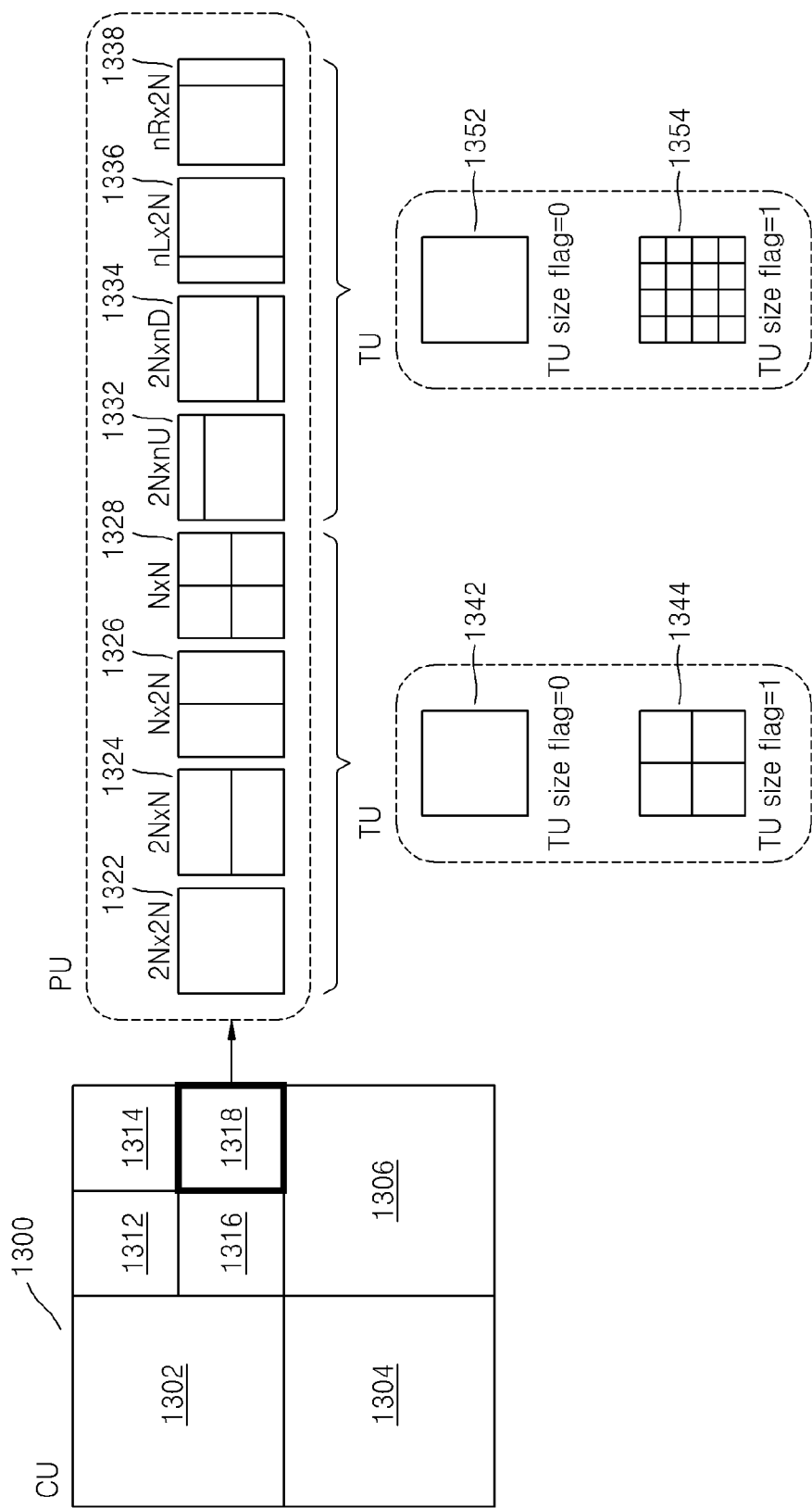
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1. A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to 1 bit, and a transformation unit may be hierarchically split having a tree structure while the TU size flag increases from 0.

Figure 14:
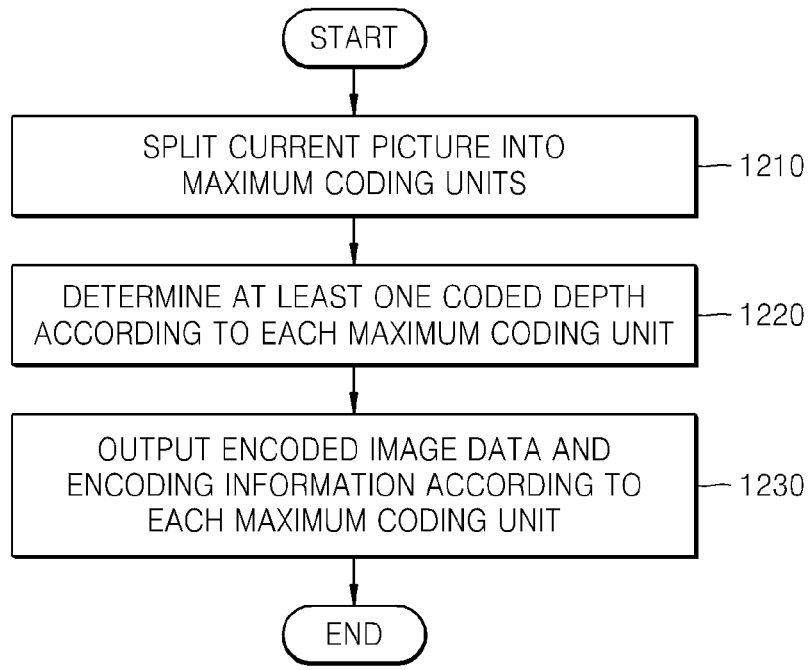
FIG. 14 is a flowchart illustrating a method of encoding a video, according to an exemplary embodiment.

FIG. 14 is a flowchart illustrating a method of encoding a video, according to an embodiment. In operation 1210, a current picture is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data constituting the final encoding result according to the coded depth is output for each maximum coding unit, with encoding information about the coded depth and an encoding mode. The information about the encoding mode may include information about a coded depth or split information, information about a partition type of a prediction unit, a prediction mode, and a size of a transformation unit. The encoded information about the encoding mode may be transmitted to a decoder with the encoded image data.

Figure 15:
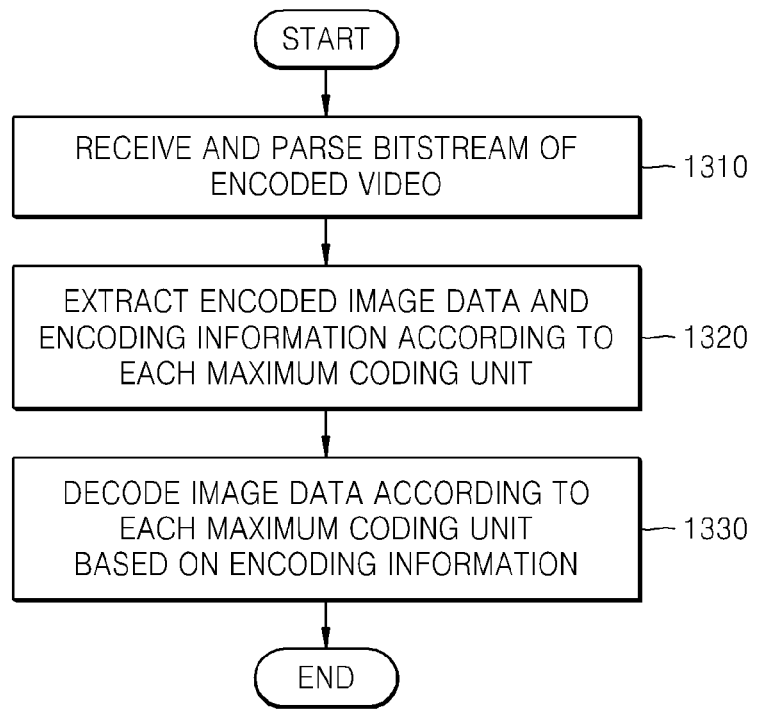
FIG. 15 is a flowchart illustrating a method of decoding a video, according to an exemplary embodiment.

FIG. 15 is a flowchart illustrating a method of decoding a video, according to an exemplary embodiment. In operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting the each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the least encoding error. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. The decoded image data may be reproduced by a reproducing apparatus, stored in a storage medium, or transmitted through a network.

Hereinafter, encoding and decoding video by performing deblocking filtering in consideration of coding units, prediction units, and transformation units, according to exemplary embodiments, will be described with reference to FIGS. 16 through 24.

Figure 16:
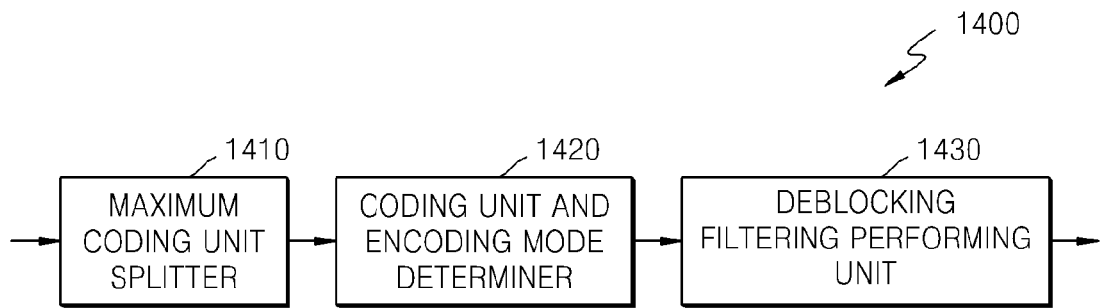
FIG. 16 is a block diagram of a video encoding apparatus employing deblocking filtering, according to an exemplary embodiment.

FIG. 16 is a block diagram of a video encoding apparatus 1400 employing deblocking filtering, according to an exemplary embodiment. Referring to FIG. 16, the video encoding apparatus 1400 includes a maximum coding unit splitter 1410, a coding unit and encoding mode determiner 1420, and a deblocking filtering performing unit 1430.

The video encoding apparatus 1400 is another exemplary embodiment of the video encoding apparatus 100. Specifically, the maximum coding unit splitter 1410 may correspond to the maximum coding unit splitter 110 included in the video encoding apparatus 100, and the coding unit and encoding mode determiner 1420 and the deblocking filtering performing unit 1430 may correspond to the coding unit determiner 120 included in the video encoding apparatus 100.

The maximum coding unit splitter 1410 may split a picture of input video data into maximum coding units, and output a result of the splitting to the coding unit and encoding mode determiner 1420.

The coding unit and encoding mode determiner 1420 may individually determine coding units corresponding to depths and encoding modes having the least encoding error with respect to each region of each of the maximum coding units by repeatedly performing prediction encoding and transformation on the maximum coding units in coding units according to depths. Here, prediction encoding may be performed in various partition-type prediction units and transformation may be performed in various-sized transformation units.

The encoding mode for each of the coding units may contain information regarding a partition type of the coding unit, which represents the size and shape of a prediction unit, a prediction mode, e.g., an inter mode, an intra mode, or a skip mode, and the size of transformation unit used when performing encoding that causes the least encoding error.

According to an exemplary embodiment, the partition type of the coding unit may include not only symmetrical partition types having sizes of N×N, N×2N, 2N×N, and 2N×2N but also asymmetrical partition types obtained by splitting the height or width of the coding unit in 1:3 or 3:1. According to an exemplary embodiment, the size of the transformation unit may be 2×2, 4×4, 8×8, 16×16, 32×32, 64×64, or 128×128, The deblocking filtering performing unit 1430 may receive video data being inversely transformed into a spatial domain, and perform deblocking filtering on the video data in the spatial domain in consideration of the encoding modes of the coding units of the video data. Specifically, quantized transformation coefficients, which were obtained by the coding unit and encoding mode determiner 1420 prediction encoding the coding units on the basis of prediction units, transforming a result of the encoding on the basis of transformation units, and quantizing a final result in the coding units based on the coded depth, may be inversely quantized and inversely transformed back into the video data in the spatial domain, and transmitted to the deblocking filtering performing unit 1430.

The deblocking filtering performing unit 1430 may perform deblocking filtering on boundaries of the prediction units or the transformation units in the coding units of the video data in the spatial domain, in consideration of the encoding modes of the coding units.

Deblocking filtering may be recursively and repeatedly performed on the coding units of each of the maximum coding units. For example, if split information of a coding unit is '1', then a current depth is not a coded depth. Thus, deblocking filtering is not performed and the coding unit of the current depth may be further divided into coding units of lower depths. If the split information of the coding unit is '0', then the current depth is a coded depth. Thus, deblocking filtering is performed on left, upper, and internal boundaries of the coding unit corresponding to the current depth.

The deblocking filtering performing unit 1430 may perform deblocking filtering by considering whether current boundaries correspond to boundaries of at least one from among a coding unit, a prediction unit, and a transformation unit. For example, boundary strength may be set based on whether current boundaries correspond to boundaries of at least one from among a coding unit, a prediction unit, and a transformation unit.

The deblocking filtering performing unit 1430 may perform deblocking filtering by considering at least one from among coding unit size, prediction unit size, and transformation unit size defined in the encoding modes of the coding units. Otherwise, the deblocking filtering performing unit 1430 may perform deblocking filtering by considering partition types of the coding units.

In addition, the deblocking filtering performing unit 1430 may perform deblocking filtering by considering at least one from among a prediction mode of each prediction unit, whether an encoded residual component is present, a motion vector, the number of reference pictures, and an index of a reference picture, defined in the encoding modes of the coding units.

The deblocking filtering performing unit 1430 may determine boundary strength in consideration of the encoding modes of the coding units. The deblocking filtering performing unit 1430 may determine whether deblocking filtering is to be performed or may determine a deblocking filtering method, in consideration of the encoding modes of the coding units. Otherwise, the deblocking filtering performing unit 1430 may perform deblocking filtering, based on the boundary strength, whether deblocking filtering is to be performed, and the deblocking filtering method that are determined in consideration of the encoding modes of the coding units.

The deblocking filtering method may include setting of the length of a deblocking filter, filter tab size, and location of a sample that is to be deblocking filtered. In this case, the sample may include the original value of a pixel, which is a deblocking filtering coefficient, and a pixel, the value of which is changed by performing deblocking filtering.

For example, an output value of a predetermined linear formula, the variables of which are filter coefficients, may be determined as a deblocking filtering output value by using a deblocking filter that uses the original values of pixels perpendicular to a boundary as coefficients.

The video data that is deblocking filtered in the coding units by the deblocking filtering performing unit 1430, may be loop filtered to be used as a reference picture for motion estimation and compensation for a subsequent picture.

The video encoding apparatus 1400 employing deblocking filtering may quantize and entropy encode transformation coefficients in coding units, and may output a bitstream that contains video data encoded in maximum coding units and information regarding a coded depth and an encoding mode for each of the coding units.

Figure 17:
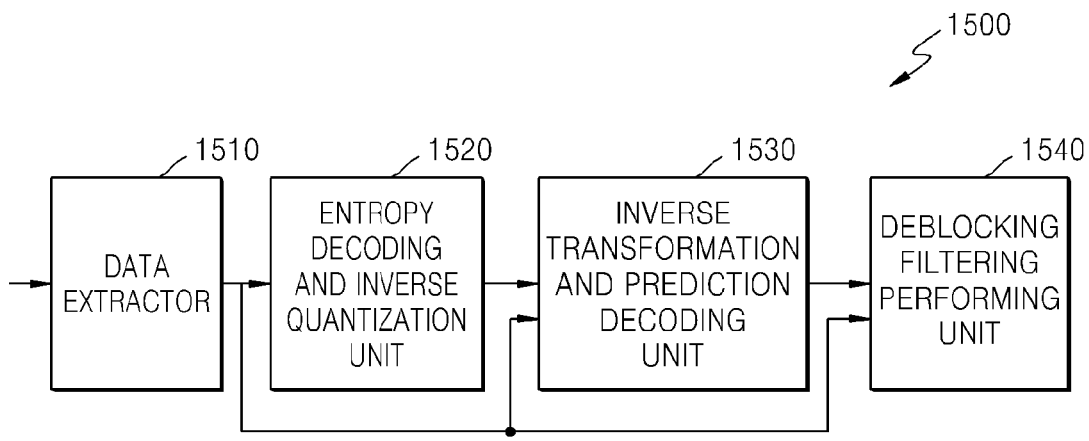
FIG. 17 is a block diagram of a video decoding apparatus employing deblocking filtering, according to an exemplary embodiment.

FIG. 17 is a block diagram of a video decoding apparatus 1500 employing deblocking filtering, according to an exemplary embodiment. Referring to FIG. 17, the video decoding apparatus 1500 includes a data extractor 1510, an entropy decoding and inverse quantization unit 1520, an inverse transformation and prediction decoding unit 1530, and a deblocking filtering performing unit 1540.

The video decoding apparatus 1500 employing deblocking filtering corresponds to the video decoding apparatus 200 of FIG. 2. Specifically, the data extractor 1510 may correspond to the image data and encoding information extractor 220 included in the video decoding apparatus 200, and the entropy decoding and inverse quantization unit 1520, the inverse transformation and prediction decoding unit 1530, and the deblocking filtering performing unit 1540 may correspond to the image data decoder 230 included in the video decoding apparatus 200.

The data extractor 1510 may parse a received bitstream to extract an encode mode of each of coding units and video data encoded in the coding units. Information regarding the size of a maximum coding unit may further be extracted from the parsing result of the bitstream.

The encoding mode of each of the coding units may contain information regarding coded depths, prediction units, a prediction mode, and transformation units that are used to decode the encoded video data. Thus, the encoded video data may be extracted in the coding units from the parsing result according to the encoding mode of each of the coding units.

The entropy decoding and inverse quantization unit 1520 may output transformation coefficients by entropy decoding and inversely quantizing the encoded video data received from the data extractor 1510. Specifically, quantized transformation coefficients may be output by entropy decoding the encoded video data, and transformation coefficients corresponding to the coding units may be output by inversely quantizing the quantized transformation coefficients.

The inverse transformation and prediction decoding unit 1530 may output video data in a spatial domain by inversely transforming and prediction decoding the transformation coefficients corresponding to the coding units, received from the entropy decoding and inverse quantization unit 1520.

Specifically, in the inverse transforming, the transformation coefficients corresponding to the coding units may be inversely transformed based on the information regarding transformation units, which is obtained from the encoding modes of the coding units extracted by the data extractor 1510, thereby producing residual data for each of the coding units.

In the prediction decoding, the residual data for each of the coding units may be intra predicted and motion compensated based on the information regarding prediction units, which is obtained from the extracted encoding modes of the coding units, thereby reconstructing the video data in the spatial domain in the coding units.

The deblocking filtering performing unit 1540 may perform deblocking filtering on the video data in the spatial domain received from the inverse transformation and prediction decoding unit 1530, in consideration of the encoding modes of the coding units.

Otherwise, the deblocking filtering performing unit 1540 may perform deblocking filtering on the video data in the spatial domain in maximum coding units, based on the extracted encoding modes of the coding units. Deblocking filtering may be performed on boundaries of the prediction units or of the transformation units in the coding units.

The deblocking filtering performing unit 1530 may recursively and repeatedly perform deblocking filtering on coding units included in each of the maximum coding units. For example, if split information of a coding unit is '1', a current depth is not a coded depth. Thus, deblocking filtering is not performed for a coding unit of the current depth and the coding unit of the current depth may be further divided into coding units of lower depths. If the split information of the coding unit is '0', the current depth is a coded depth. Thus, deblocking filtering is performed on left, upper, and internal boundaries of the coding unit corresponding to the current depth.

Similar to as described above, the deblocking filtering 1430 may perform deblocking filtering, depending on whether a current boundary correspond to boundaries of a coding unit, the prediction units, and the transformation units according to the encoding modes of the coding units.

Various examples of an encoding mode considered for deblocking filtering may include coding unit size, prediction size, transformation unit size, and partition types of the coding units, defined in the encoding modes of the coding units. Also, deblocking filtering may be performed in consideration of at least one from among a prediction mode, whether an encoded residual component exists, a motion vector, the number of reference pictures, and an index of a reference picture, similar to video codec according to the existing standards.

Also, deblocking filtering may be performed in consideration of encoding modes of coding units, prediction units, and transformation units, according to a deblocking filtering method that includes information regarding a deblocking filter according to boundary strength determined based on the above various examples of encoding modes, whether deblocking filtering is to be performed, and filter tab size.

A result of deblocking filtering the video data may be output as reproduced video in the spatial domain. Otherwise, the result of deblocking filtering the video data may be loop filtered so as to be used as a reference picture for compensating for motion of a subsequent picture.

In the video encoding apparatus 1400 and the video decoding apparatus 1500 employing deblocking filtering according to exemplary embodiments, a picture of an image is split into maximum coding units and each of the maximum coding units is encoded in coding units according to depths, which are individually determined. Thus, even adjacent coding units may be different in terms of size or type.

In the video encoding apparatus 1400 and the video decoding apparatus 1500 according to exemplary embodiments, a coding unit is not limited to a 16×16 macroblock and may be one of various sized or shaped blocks, e.g., 2×2, 4×4, 8>8, 16×16, 32×32, 64×64, 128×128, and 256×256 blocks.

In the video encoding apparatus 1400 and the video decoding apparatus 1500 according to exemplary embodiments, each transformation unit is not limited to a 4×4 or 8×8 block and may be one of various sized or shaped blocks, e.g., 2×2, 4×4, 8×8, 16×16, 32×32, 64×64, 128×128, and 256×256 blocks. That is, maximum and minimum sizes of the transformation units are not limited.

In the video encoding apparatus 1400 and the video decoding apparatus 1500 according to exemplary embodiments, prediction units for performing prediction coding and transformation units for performing transforming/inverse transforming are separately set from among coding units. Thus, a transformation unit may be larger than a prediction unit. The relationship between a coding unit, a transformation unit, and a prediction unit, according to an exemplary embodiment, has been described above with reference to FIGS. 10 to 12.

In this disclosure, a boundary may be a boundary of a coding unit, a prediction unit, or a transformation unit. For example, a boundary may be a common boundary of a coding unit and prediction unit, may be a common boundary of a transformation unit and a prediction unit, or may be a common boundary of a transformation unit and a prediction unit. Also, a boundary of a data unit may be a common boundary of all of a coding unit, a prediction unit, and a transformation unit. Also, a boundary of a predetermine data unit may be a boundary of a maximum coding unit.

According to an exemplary embodiment, boundary characteristics are analyzed so as to determine whether deblocking filtering is to be performed on a boundary. For example, 'disable_deblocking_filter_idc' defined in a slice header may be used to analyze the boundary characteristics. 'disable_deblocking_filter_idc' denotes a parameter for determining whether deblocking filtering is to be performed on a boundary of a slice. If 'disable_deblocking_filter_idc' is '1', deblocking filtering may not be performed on the boundary of the slice.

For example, if 'disable_deblocking_filter_idc' is '1' and a boundary is a boundary of a picture, then deblocking filtering is not performed on a boundary of a coding unit. Thus, if 'disable_deblocking_filter_idc' is not '1' and a boundary is not a boundary of a picture, then the deblocking filtering performing units 1430 and 1540 may perform deblocking filtering on a boundary of a coding unit. If 'disable_deblocking_filter_idc' is not equal to or is greater than '1', deblocking filtering may be performed on a boundary of a prediction unit or a transformation unit.

In video encoding and decoding methods according to an exemplary embodiment, a coding unit, a prediction unit, and a transformation unit are all separately set, and thus, a deblocking method may be individually determined for each of the coding unit, the prediction unit, and the transformation unit according to boundary characteristics thereof. Thus, in the video encoding apparatus 1400 and the video decoding apparatus 1500 according to exemplary embodiments, a deblocking filtering method may be set based on boundary characteristics of a data unit.

For example, a deblocking filtering method for a boundary of a maximum coding unit may be set. If a current boundary is a boundary of a maximum coding unit, deblocking filtering may be performed on the current boundary according to the deblocking filtering method for a boundary of a maximum coding unit. A deblocking filtering method for a boundary of a coding unit may be set. If a current boundary is a boundary of a coding unit other than a maximum coding unit, deblocking filtering may be performed on the current boundary according to the deblocking filtering method for a boundary of a coding unit.

A deblocking filtering method for a boundary of a transformation unit may be set. If a current boundary is not a boundary of a maximum coding unit or a coding unit and is a boundary of a transformation unit, deblocking filtering may be performed on the current boundary according to the deblocking filtering method for a boundary of a transformation unit.

A deblocking filtering method for a boundary of a prediction unit may be set. If a current boundary is not a boundary of a maximum coding unit, a coding unit, or a transformation unit and is a boundary of a prediction unit, deblocking filtering may be performed on the current boundary according to the deblocking filtering method for a boundary of a prediction unit.

A deblocking filtering method may include setting of whether deblocking filtering is to be performed, the length of a deblocking filter, and the number and location of samples that are to be deblocking filtered.

According to an exemplary embodiment, the length of a boundary may vary according to the size or type of a coding unit, a prediction unit, or a transformation unit.

Figure 18:
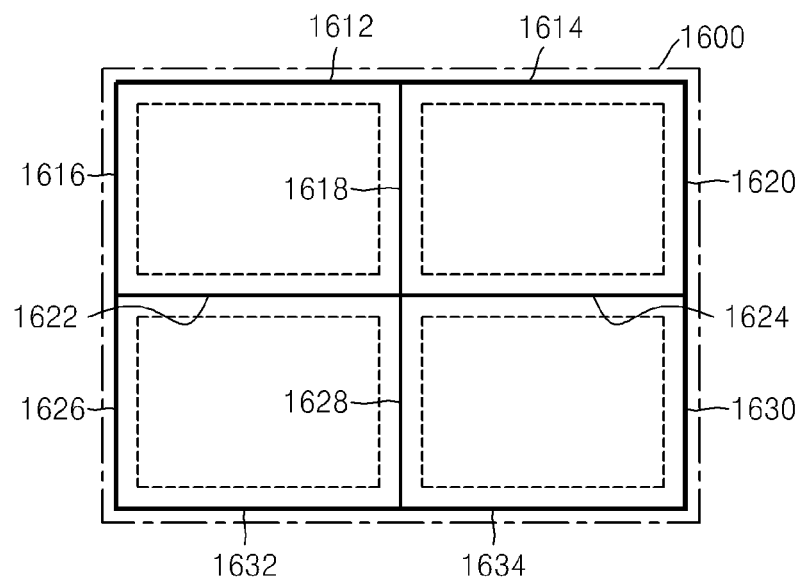
FIG. 18 is a block diagram for describing a relationship between a coding unit, a prediction unit, and a transformation unit, according to another exemplary embodiment.
Figure 19:
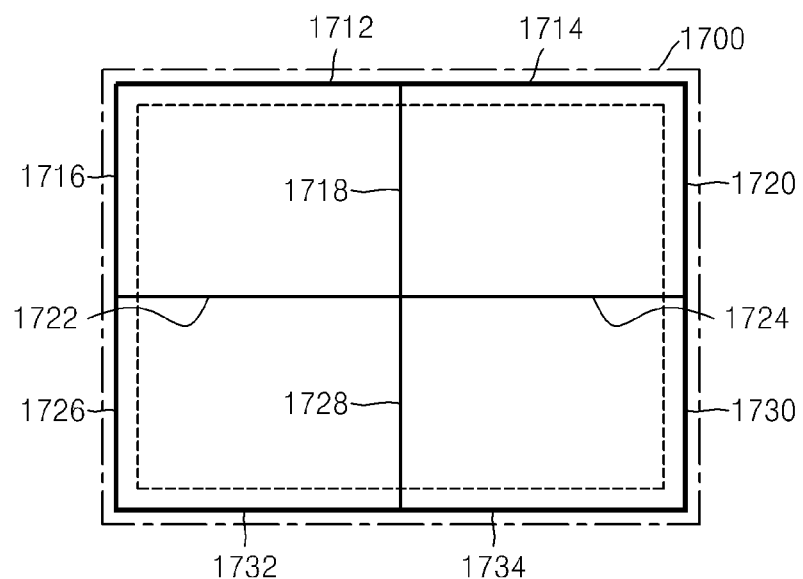
FIG. 19 is a block diagram for describing a relationship between a coding unit, a prediction unit, and a transformation unit, according to another exemplary embodiment.
Figure 20:
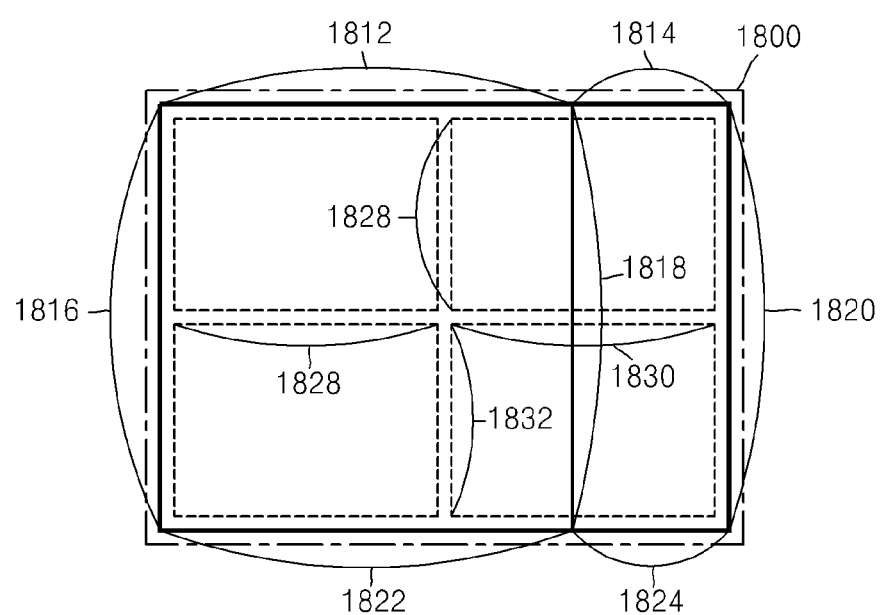
FIG. 20 is a block diagram for describing a relationship between a coding unit, a prediction unit, and a transformation unit, according to another exemplary embodiment.

The relationship between a coding unit, a prediction unit, and a transformation unit according to other exemplary embodiments will now be described with reference to FIGS. 18 to 20. In FIGS. 18 to 20, reference numerals 1600, 1700, and 1800 denote coding units other than maximum coding units.

FIG. 18 is a block diagram for describing the relationship between a coding unit, a prediction unit, and a transformation unit, according to another exemplary embodiment. The coding unit 1600 is a 2N×2N block, and is prediction encoded on the basis of a prediction unit of an N×N partition type and is transformed on the basis of an N×N transformation unit. Thus, boundaries 1612, 1614, 1616, 1620, 1626, 1630, 1632, and 1634 are common boundaries of the coding unit 1600, prediction units, and transformation units, and boundaries 1618, 1622, 1624, and 1628 are boundaries of the prediction units and the transformation units.

The deblocking filtering performing units 1430 and 1540 of FIGS. 16 and 17 may perform a deblocking filtering method for a boundary of a coding unit on the boundaries 1612, 1614, 1616, 1620, 1626, 1630, 1632, and 1634 of the coding unit 1600 other than a maximum coding unit.

Otherwise, the deblocking filtering performing units 1430 and 1540 may perform a deblocking filtering method for a boundary of a transformation unit on the boundaries 1618, 1622, 1624, and 1628 of the transformation units other than the coding unit 1600 or a maximum coding unit.

FIG. 19 is a block diagram for describing a relationship between a coding unit, a prediction unit, and a transformation unit, according to another exemplary embodiment. A coding unit 1700 is a 2N×2N block, and is prediction encoded based on a prediction unit of an N×N partition type and is transformed on the basis of a 2N×2N transformation unit. Thus, boundaries 1712, 1714, 1716, 1720, 1726, 1730, 1732, and 1734 are common boundaries of the coding unit 1700, prediction units, and transformation units, and boundaries 1718, 1722, 1724, and 1728 are boundaries of only the prediction units.

The deblocking filtering performing units 1430 and 1540 of FIGS. 16 and 17 may perform a deblocking filtering method for a boundary of a coding unit on the boundaries 1712, 1714, 1716, 1720, 1726, 1730, 1732, and 1734 of the coding unit 1700 other than a maximum coding unit.

The deblocking filtering performing units 1430 and 1540 may perform a deblocking filtering method for a boundary of a prediction unit on the boundaries 1718, 1722, 1724, and 1728 of the prediction units other than a maximum coding unit, the coding unit 1700, or transformation units.

FIG. 20 is a block diagram for describing a relationship between a coding unit, a prediction unit, and a transformation unit, according to another exemplary embodiment. A coding unit 1800 is a 4N×4N block, and is prediction encoded on the basis of a prediction unit of an asymmetrical partition type obtained by splitting the width of the coding unit 1800 according to a ratio of 3:1 and is transformed on the basis of a 2N×2N transformation unit. Thus, boundaries 1812, 1814, 1816, 1820, 1822, and 1824 are common boundaries of the coding unit 1800, prediction units, and transformation units, a boundary 1818 is a boundary of only a prediction unit, and boundaries 1826, 1828, 1830, and 1832 are boundaries of only transformation units.

The deblocking filtering performing units 1430 and 1540 of FIGS. 16 and 17 may perform a deblocking filtering method for a boundary of a coding unit on the boundaries 1812, 1814, 1816, 1820, 1822, and 1824 of the coding unit 1800 other than a maximum coding unit.

Also, the deblocking filtering performing units 1430 and 1540 of FIGS. 16 and 17 may perform a deblocking filtering method for a boundary of a transformation unit on the boundaries 1826, 1828, 1830, and 1832 of the transformation units other than a maximum coding unit or the coding unit 1800.

Also, the deblocking filtering performing units 1430 and 1540 may perform a deblocking filtering method for a boundary of a prediction unit on the boundary 1818 of the prediction unit other than a maximum coding unit, the coding unit 1800, or the transformation units.

Figure 21:
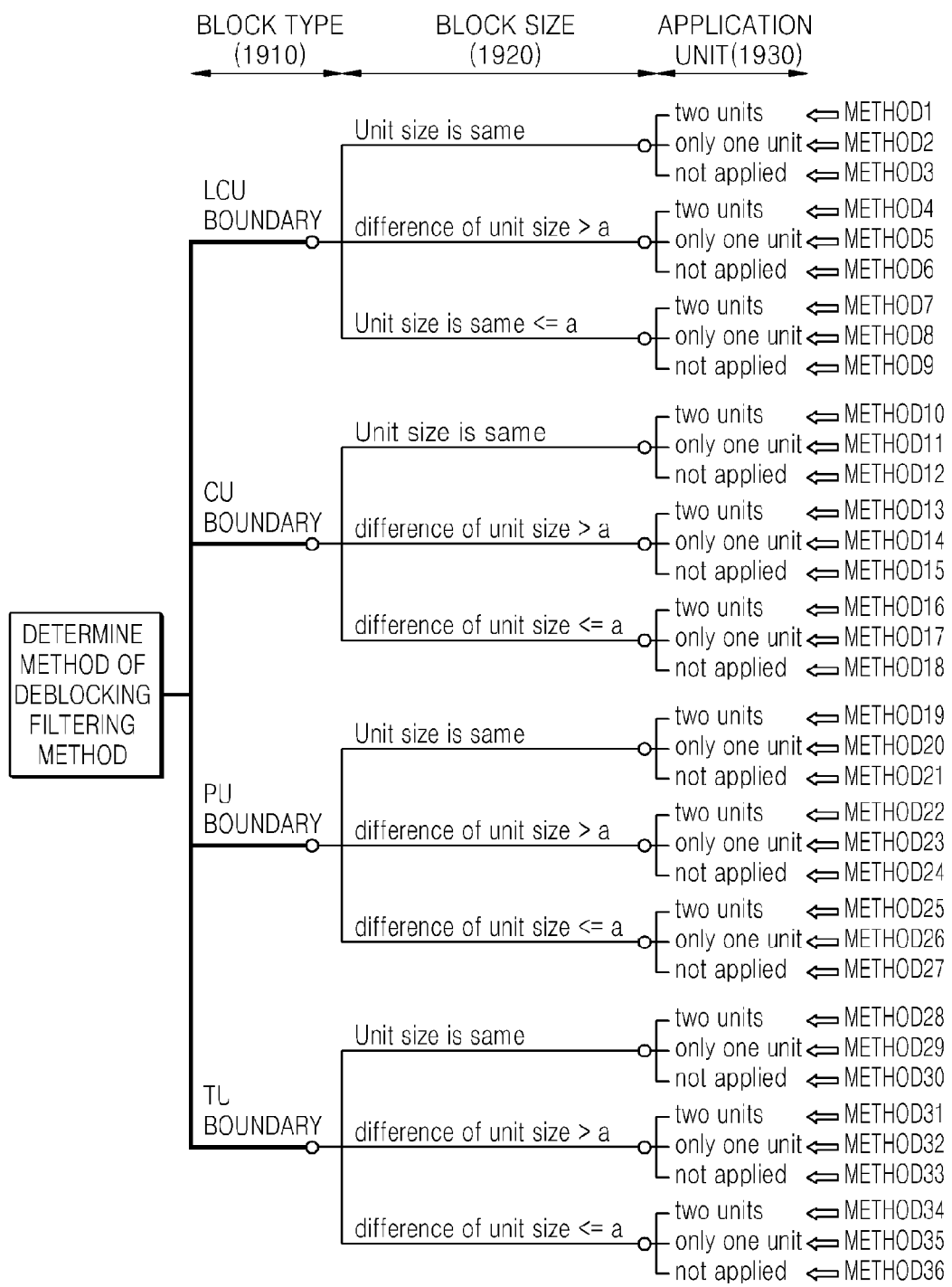
FIG. 21 illustrates a method of determining a deblocking filtering method, according to an exemplary embodiment.

FIG. 21 illustrates a method of determining a deblocking filtering method, according to an exemplary embodiment. Deblocking filtering methods may be set with respect to boundaries that satisfy a combination of various conditions, respectively. For example, the various conditions may include types of data units that form a boundary, a prediction mode, whether a transformation coefficient that is not '0' is present in a block, a motion vector, a reference picture, the size of each of the data units, and various encoding/decoding techniques applied to the data units. A deblocking filtering method may include setting of whether deblocking filtering is to be performed, the length of a deblocking filter, and the number and location of samples that are to be deblocking filtered.

For example, the deblocking filtering performing units 1430 and 1540 may determine an application unit 1930 that denotes a number of data units in which deblocking filtering is to be performed on boundaries thereof, based on a block type 1910 and a block size 1920 of two adjacent data units that form the boundary to be deblocking filtered, which are defined in an encoding mode.

The number of data units in which deblocking filtering is to be performed, i.e., the application unit 1930, may be determined to be '2', '1', or '0', based on whether the boundary between the two adjacent data units is a boundary of a maximum coding unit (LCU), a coding unit (CU), a prediction unit (PU), or a transformation unit (TU) (block type 1910) and whether the sizes of the two adjacent data units are the same, are greater than a predetermined threshold or are not greater than the predetermined threshold (block size 1920).

Also, a deblocking filtering method may be set to satisfy at least one of the above conditions. For example, a different deblocking filtering method may be set for each of a plurality of the application units 1930 related to a block boundary that satisfies a combination of conditions of the block type 1910 and the block size 1920. Referring to FIG. 21, 36 conditions of a target to be filtered may be determined according to a combination of the conditions of the block type 1910, the block size 1920, and the application unit 1930. The deblocking filtering performing units 1430 and 1540 may perform deblocking filtering by individually determining deblocking filtering methods 1 through 36, based on conditions of a boundary that is to be deblocking filtered. That the deblocking filtering methods 1 through 36 are determined means that different deblocking filtering methods are respectively set for 36 boundary conditions. Thus, the same deblocking filtering method may be set for different boundary conditions. Also, the same deblocking filtering method may be set for a group of boundary conditions. For example, the same deblocking filtering method may be set for block boundaries of the same block type or may be set for block boundaries having the same size.

Although FIG. 21 illustrates only some deblocking filtering conditions, e.g., block type and block size of data units that form a boundary and the number of data units that are to be deblocking filtered, the deblocking filtering conditions may further include at least one of a prediction mode, such as an intra mode or an inter mode, whether an encoded residual component is present in a block, a motion vector, the number and index of reference pictures, and an encoding technique.

Figure 22:
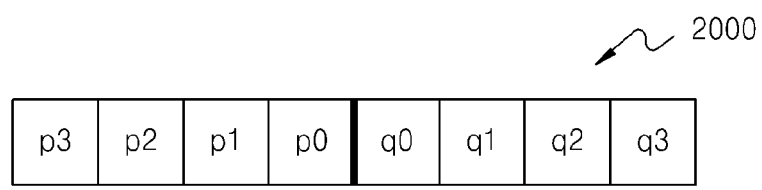
FIG. 22 illustrates samples that are to be deblocking filtered, according to an exemplary embodiment.

FIG. 22 illustrates samples 2000 that are to be deblocking filtered, according to an exemplary embodiment. From among the samples 2000, samples p3, p2, p1, and p0 are pixels present at a left side of a block boundary, and the other samples q0, q1, q2, and q3 are pixels present at a right side of the block boundary. Although FIG. 22 illustrates the samples 2000 arranged in a horizontal direction in which deblocking filtering is performed, with respect to a vertical block boundary, deblocking filtering may be performed on samples arranged in a vertical direction with respect to a horizontal block boundary.

According to an exemplary embodiment, boundary strength, whether deblocking filtering is to be performed, and the length of a deblocking filter may be determined, based on the original values of the samples 2000.

For example, boundary strength may be determined by the original values of the samples 2000. Whether deblocking filtering is to be performed on the block boundary may be determined according to a combination of conditions of the boundary strength and differences between the original values of the samples 2000. Also, the length of a deblocking filter for the samples 2000 and a number and locations of samples, the values of which are changed when blocking filtering is performed, may be determined according to a combination of the conditions of the boundary strength and the conditions of differences between the original values of the samples 2000.

According to an exemplary embodiment, if the boundary strength of the deblocking filter for a luma component is '4', results of deblocking filtering the samples p2 and q2 may be disregarded from among the samples 2000 used as deblocking filtering coefficients, except for the samples p3 and q3.

According to an exemplary embodiment, the deblocking filtering performing units 1430 and 1540 of FIGS. 16 and 17 may determine boundary strength, whether deblocking filtering is to be performed, the length of the deblocking filter, and a number and location of samples that are to be filtered, based on whether a current block boundary is a boundary of a coding unit, a prediction unit, or a transformation unit.

Figure 23:
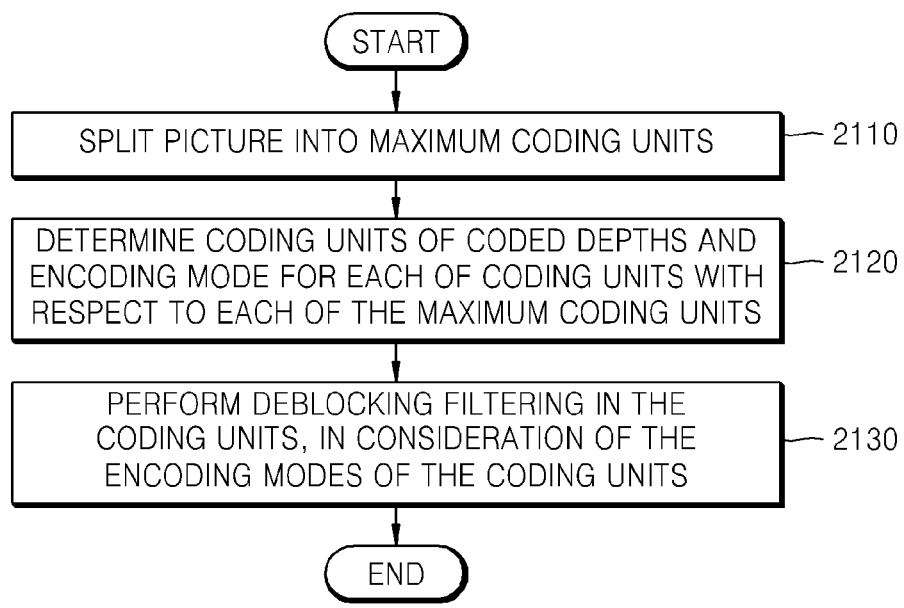
FIG. 23 is a flowchart illustrating a method of encoding video by using deblocking filtering, according to an exemplary embodiment.

FIG. 23 is a flowchart illustrating a method of encoding video by using deblocking filtering, according to an exemplary embodiment. Referring to FIG. 23, in operation 2110, a picture is split into maximum coding units.

In operation 2120, coding units of coded depths, and an encoding mode for each of coding units, which is related to the coding units, prediction units, and transformation units, are determined with respect to each of the maximum coding units.

In operation 2130, deblocking filtering is performed on video data that has been inversely transformed into a spatial domain in the coding units, in consideration of the encoding modes for the coding units. A deblocking filtering method that specifies whether deblocking filtering is to be performed on boundaries, boundary strength of a deblocking filter, and filter tab size, may be determined according to types of data units including coding units, prediction units, and transformation units that form the boundaries, the sizes of the data units, and a partition mode, defined in the encoding modes of the coding units.

Figure 24:
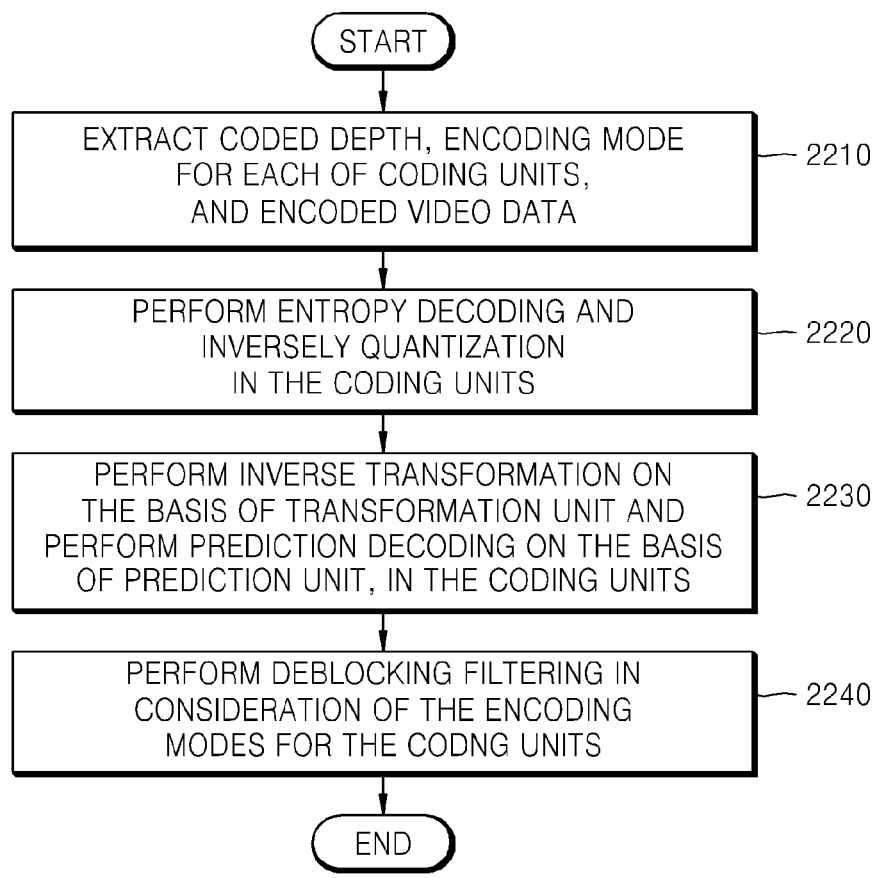
FIG. 24 is a flowchart illustrating a method of decoding video by using deblocking filtering, according to an exemplary embodiment.

FIG. 24 is a flowchart illustrating a method of decoding video by using deblocking filtering, according to an exemplary embodiment. Referring to FIG. 24, in operation 2210, a received bitstream is parsed to extract an encoding mode for each of coding units and video data that has been encoded in the coding units.

In operation 2220, transformation coefficients are obtained by entropy decoding and inversely quantizing the encoded video data in the coding units.

In operation 2230, video data in a spatial domain is reconstructed by inversely transforming the transformation coefficients in transformation units and prediction decoding the transformation coefficients in prediction units, defined in the encoding modes for the coding units.

In operation 2240, deblocking filtering is performed on the video data in the spatial domain in consideration of the encoding modes for the coding units. A deblocking filtering method that specifies whether deblocking filtering is to be performed on boundaries, boundary strength of a deblocking filter, and filter tab size, may be determined according to types of data units including coding units, prediction units, and transformation units that form the boundaries, the sizes of the data units, and a partition mode, defined in the encoding modes of the coding units.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A method of decoding video by using deblocking filtering, performed by at least one processor, the method comprising:

receiving a bitstream including data of a picture, information about a size of a maximum coding unit, and split information;

splitting the picture into one or more maximum coding units using the information about the size of the maximum coding unit;

hierarchically splitting the maximum coding unit among the one or more maximum coding units into one or more coding units based on the split information;

determining one or more prediction units in a coding unit among the one or more coding units using partition type information, wherein the partition type information indicates one of a symmetric type and an asymmetric type;

determining one or more transform units in the coding unit using size information of a transform unit, wherein the transform unit among the one or more transform units is rectangular with a horizontal size and a vertical size indicated by the size information;

performing prediction on a prediction unit among the one or more prediction units in the coding unit and inverse-transformation on the transform unit in the coding unit, in order to generate a reconstructed coding unit;

when a boundary included in the reconstructed coding unit corresponds to at least one of a boundary of the prediction unit and a boundary of the transform unit, determining deblocking filtering method including at least one of a number of filter-taps and location of pixels to be deblocking-filtered, based on at least one of a boundary strength and neighboring pixels adjacent to the boundary included in the reconstructed coding unit; and performing deblocking filtering on the neighboring pixels according to the deblocking filtering method, in order to generate a filtered coding unit including the deblocking-filtered pixels.

2. The method of claim 1, wherein the prediction mode includes inter-prediction mode and intra prediction mode.

3. The method of claim 1, wherein filtering method is determined when the boundary strength does not correspond to no-filtering.

4. The method of claim 1, wherein the boundary included in the reconstructed coding unit is one of a vertical boundary and a horizontal boundary.

5. The method of claim 1, wherein:
when the boundary included in the reconstructed coding unit is the vertical boundary, the neighboring pixels are located in a column with the vertical boundary as a center, and
the neighboring pixels includes left side pixels($p3$, $p2$, $p1$, $p0$) and right side pixels($q0$, $q1$, $q2$, $q3$).

6. The method of claim 1, wherein the filtered coding unit including the deblocking-filtered pixels is used as a reference picture for motion-compensation of another picture.

* * * * *